US012378809B2

(12) United States Patent
Held

(10) Patent No.: US 12,378,809 B2
(45) Date of Patent: Aug. 5, 2025

(54) BODY COMPRISING PARTS WHICH ARE PIVOTABLE BETWEEN TWO POSITIONS, DRIVEN BY AN ELECTRIC MOTOR

(71) Applicant: Wolfgang Held, Hard (AT)

(72) Inventor: Wolfgang Held, Hard (AT)

(73) Assignee: Grass GmbH, Reinheim (DE)

( * ) Notice: Subject to any disclaimer, the term of this patent is extended or adjusted under 35 U.S.C. 154(b) by 0 days.

(21) Appl. No.: 18/031,885

(22) PCT Filed: Oct. 14, 2021

(86) PCT No.: PCT/EP2021/078454
§ 371 (c)(1),
(2) Date: Apr. 14, 2023

(87) PCT Pub. No.: WO2022/079173
PCT Pub. Date: Apr. 21, 2022

(65) Prior Publication Data
US 2024/0018818 A1 Jan. 18, 2024

(30) Foreign Application Priority Data
Oct. 15, 2020 (DE) ..................... 10 2020 127 223.5

(51) Int. Cl.
*E05F 15/611* (2015.01)

(52) U.S. Cl.
CPC ....... *E05F 15/611* (2015.01); *E05Y 2400/338* (2013.01); *E05Y 2400/44* (2013.01); *E05Y 2900/20* (2013.01)

(58) Field of Classification Search
CPC .... E05F 15/611; E05F 15/70; E05Y 2400/44; E05Y 2900/20; E05Y 2400/338;
(Continued)

(56) References Cited

U.S. PATENT DOCUMENTS 9,318,280 B2 4/2016 Bachmann
2004/0090083 A1 * 5/2004 Greuel ................. G05B 19/416 296/146.4
(Continued)

FOREIGN PATENT DOCUMENTS

DE 202004007168 8/2004
DE 202007006687 U1 * 10/2008 .............. E05F 1/105
(Continued)

OTHER PUBLICATIONS

The International Search Report (with English translation) and the Written Opinion (with English translation) of the International Searching Authority, or the Declaration for International Application No. PCT/EP2021/078454, Feb. 11, 2022.
(Continued)

*Primary Examiner* — Hiwot E Tefera
(74) *Attorney, Agent, or Firm* — Brett A. Schenck

(57) ABSTRACT

The present invention relates to a body, in particular a cabinet, with a part that can be pivoted between two positions by an electric motor, for example a door or panel. During its closing movement, the body, in particular the cabinet, actuates a control device that activates the motor. A separate sensor, which reacts to the movements of the control device and by means of which the motor output can be changed, is arranged between the control device and the motor.

8 Claims, 5 Drawing Sheets

Figure 1:
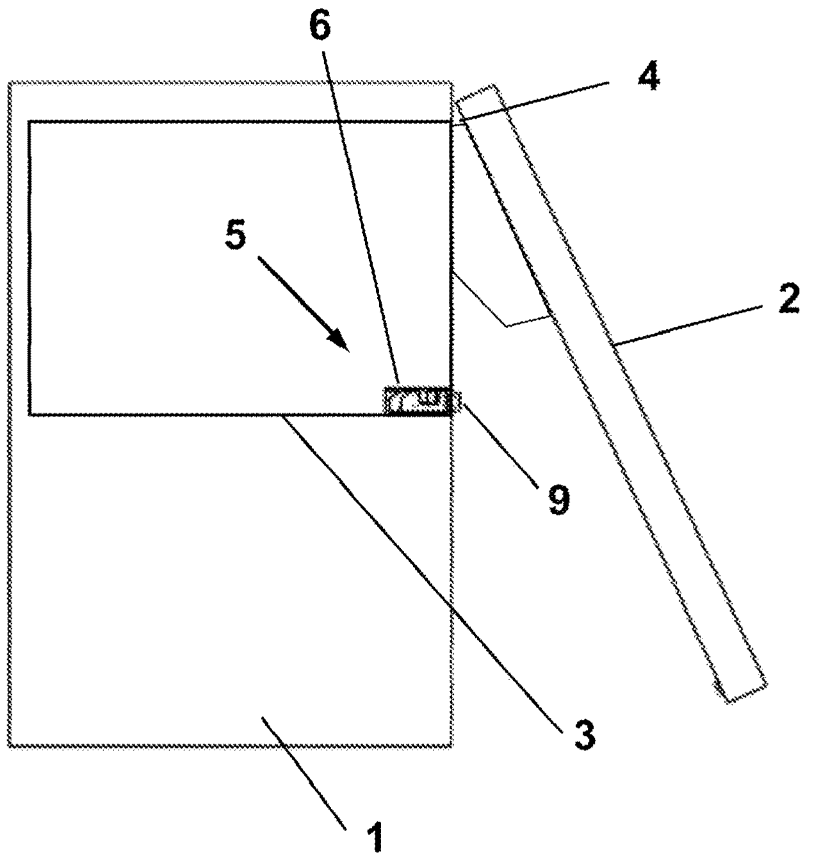

(58) Field of Classification Search
CPC ......... E05Y 2400/445; E05Y 2800/232; E05Y 2201/499; E05Y 2201/434; E05Y 2201/46; A47B 88/463
See application file for complete search history.

(56) References Cited

U.S. PATENT DOCUMENTS

| | | | | |
|---|---|---|---|---|
| 2006/0279243 | A1* | 12/2006 | Schachtl | E05F 15/603 318/466 |
| 2007/0289397 | A1 | 12/2007 | Ritter | |
| 2010/0066220 | A1* | 3/2010 | Grimm | H01H 9/181 312/237 |
| 2011/0279004 | A1* | 11/2011 | Assmann | A47L 15/4259 312/228 |
| 2012/0017512 | A1* | 1/2012 | Lee | E05F 15/614 49/358 |
| 2016/0010379 | A1* | 1/2016 | Sauerwein | E05F 15/70 49/350 |
| 2016/0186476 | A1* | 6/2016 | Held | E05F 1/105 49/263 |
| 2016/0273617 | A1* | 9/2016 | Nickel | E05F 15/611 |
| 2016/0312513 | A1* | 10/2016 | Heydel | E05F 15/614 |
| 2018/0187470 | A1* | 7/2018 | Song | F25D 23/087 |
| 2018/0223582 | A1* | 8/2018 | Shin | E05F 15/619 |
| 2018/0283077 | A1* | 10/2018 | Lee | E05D 3/16 |
| 2021/0115721 | A1* | 4/2021 | Nowak | F41H 5/22 |

FOREIGN PATENT DOCUMENTS

| | | | |
|---|---|---|---|
| DE | 102019128526 | 3/2021 | |
| DE | 202021102221 | 4/2021 | |
| EP | 1898034 B1 * | 8/2015 | A47B 88/463 |
| WO | WO2008031748 A2 | 3/2008 | |

OTHER PUBLICATIONS

The European Search Report (with English translation) and the Written Opinion (with English translation) of the IEuropean Patent Office for EP Application No. 20220169020, Sep. 7, 2022.

* cited by examiner

BODY COMPRISING PARTS WHICH ARE PIVOTABLE BETWEEN TWO POSITIONS, DRIVEN BY AN ELECTRIC MOTOR

In conventional bodies, especially cabinets, the flaps or drawers are motor-driven. The switching process is usually triggered by a plunger. The plunger is arranged at the bump between the flap and the body of the cabinet.

The lifting movement of the plunger is relatively large. As a result, the switching process is only triggered when the plunger is almost in the retracted position.

Since drawers and flaps with large dimensions also have larger tolerances, the switching process requires that the flap or drawer is actuated in the area of the plunger. The plunger has to be almost retracted in order to trigger the switching process.

If the flaps/drawers are relatively large or wide, the plunger is only actuated effectively when the flap is approximately in the closed state, or the user must actuate the flap in the area of the plunger or the plunger individually.

This is perceived as a disadvantage for cabinets.

Proceeding from the above prior art, the object of the invention is to remedy this situation.

The stated object is achieved according to the invention in that the plunger works together with a sensor. The sensor generates a signal from even the slightest movement of the plunger, which activates the motor.

It can be seen that the invention is implemented in any case when a sensor is arranged between a conventional tappet or plunger (button) and the motor control. The sensor reacts sensitively to movements of the plunger, which can also be called control device, and thus triggers the activation of the motor, i.e. switching it on and off, even with the minimum stroke of the plunger. Thus, the motor power is adaptable via the control device.

Further expedient and advantageous refinements of the invention are shown in the dependent claims.

Figure 2:
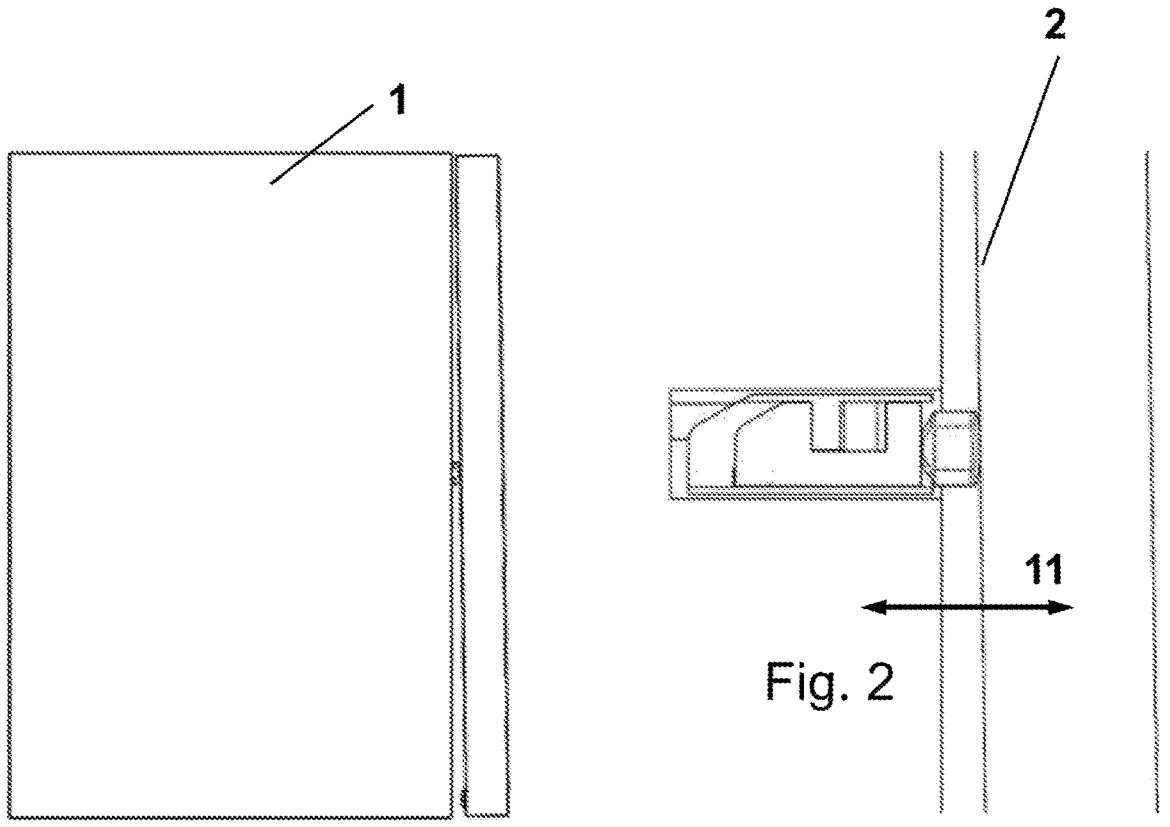
Figure 3:
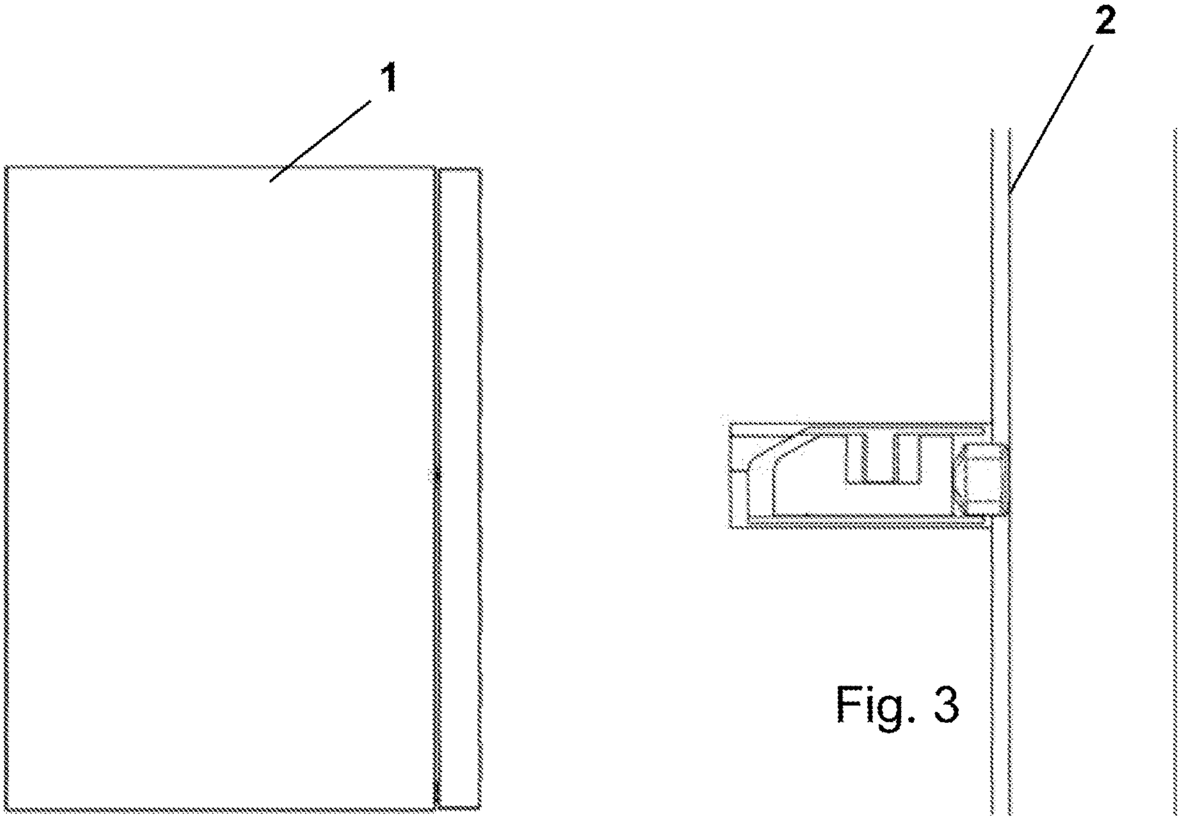
Figure 4:
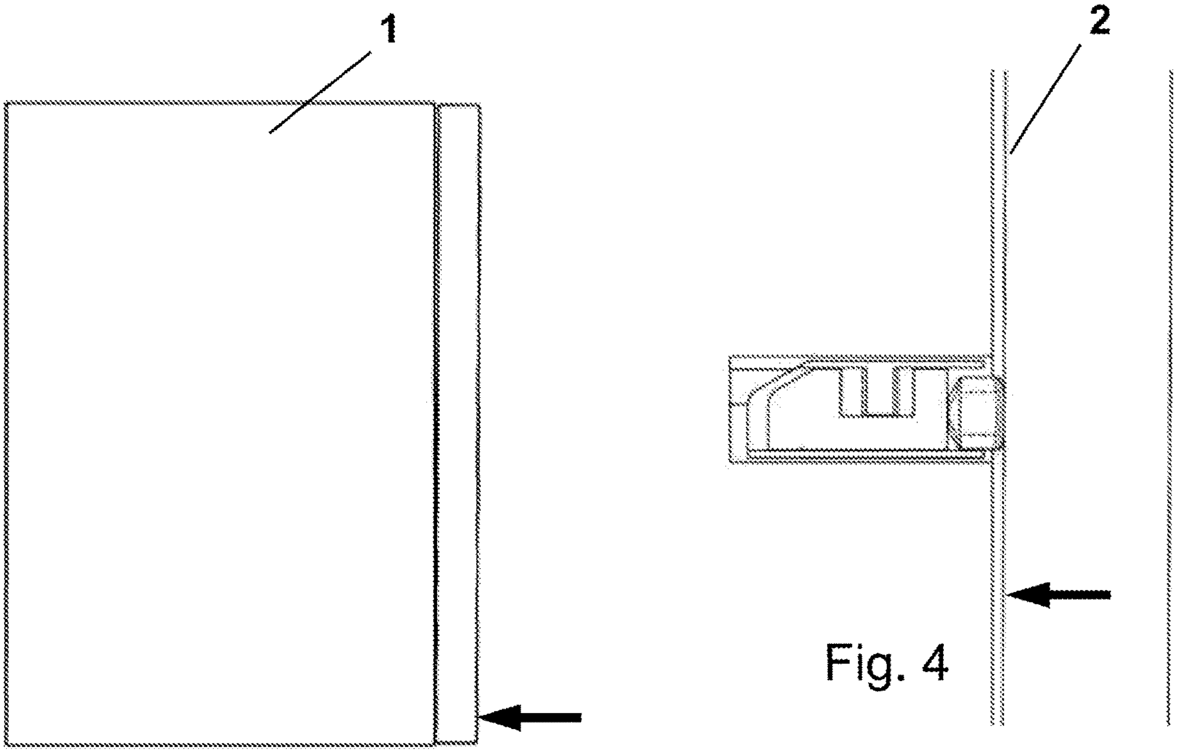
Figure 5:
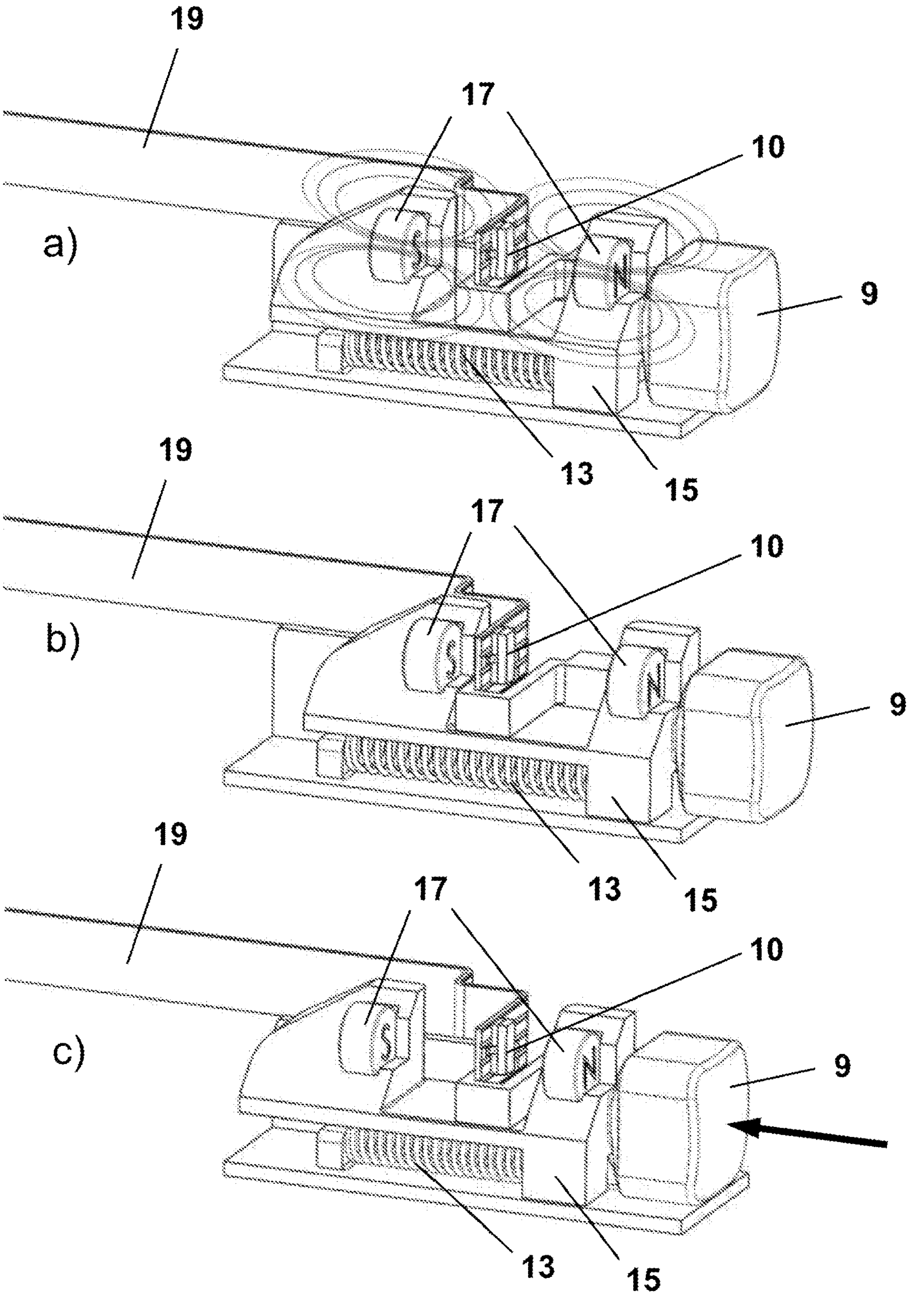
Figure 6:
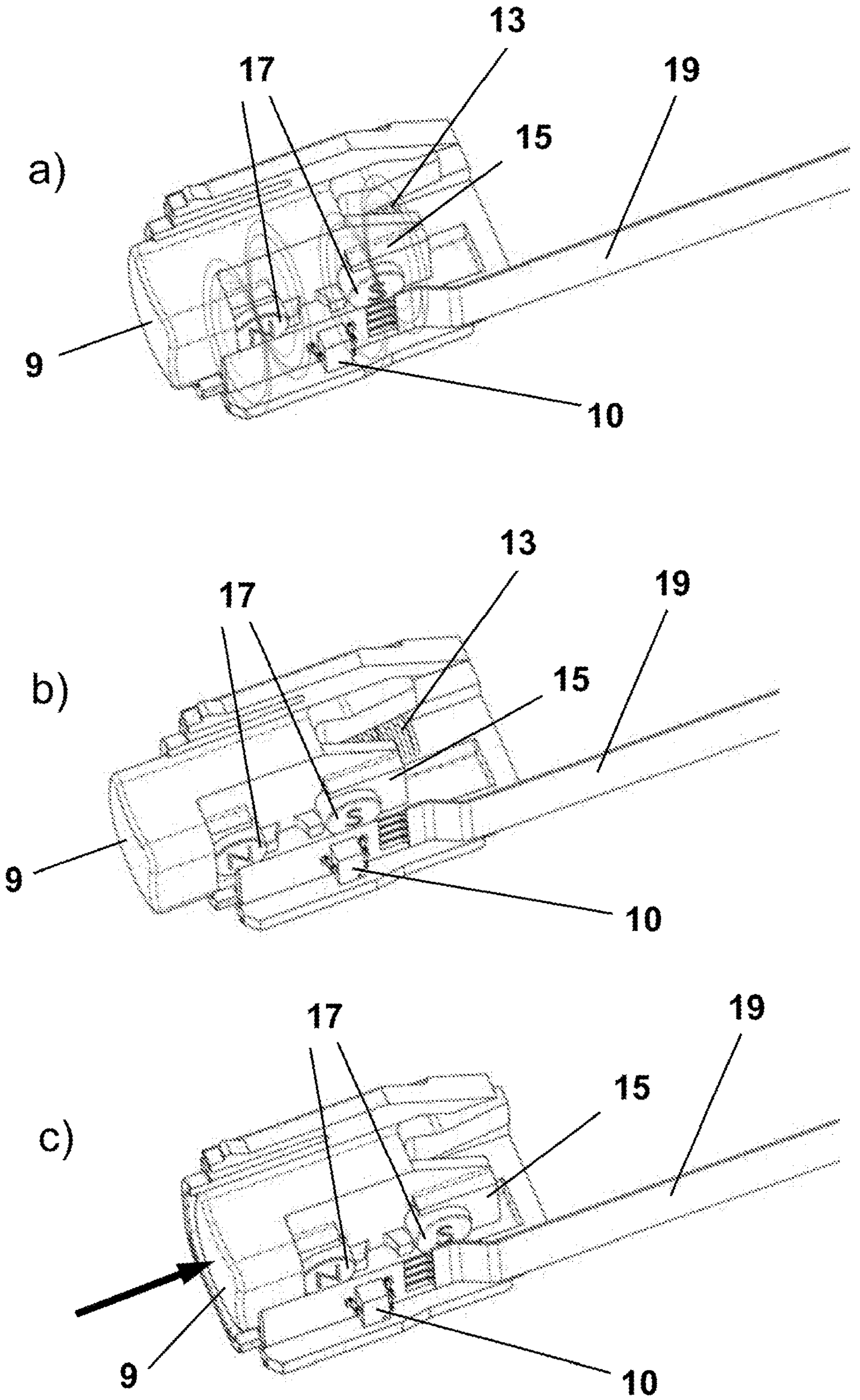
Figure 7:
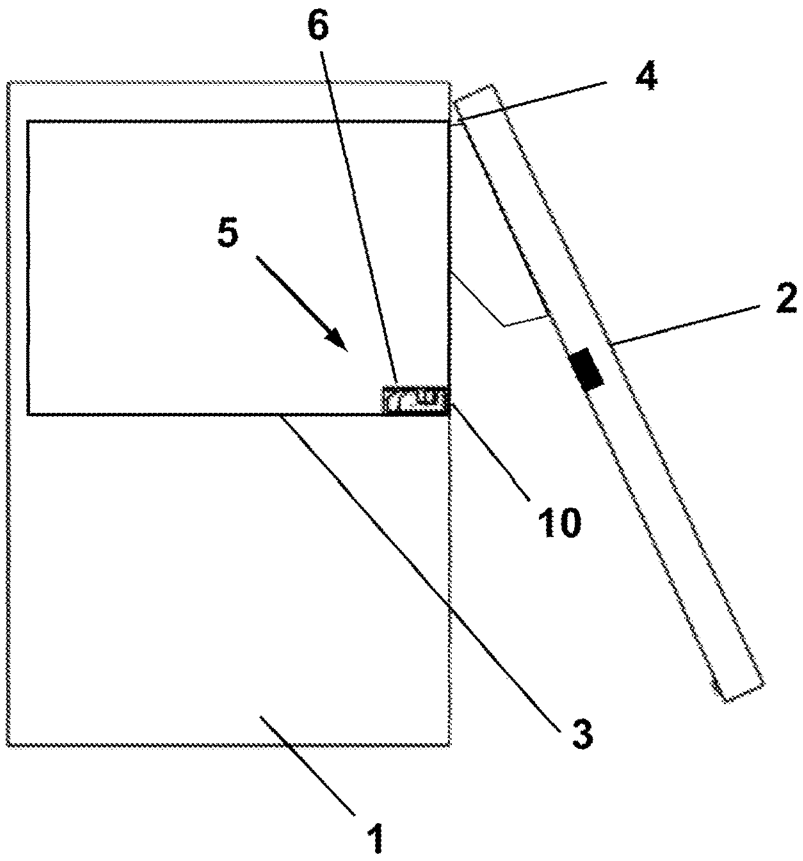
Figure 8:
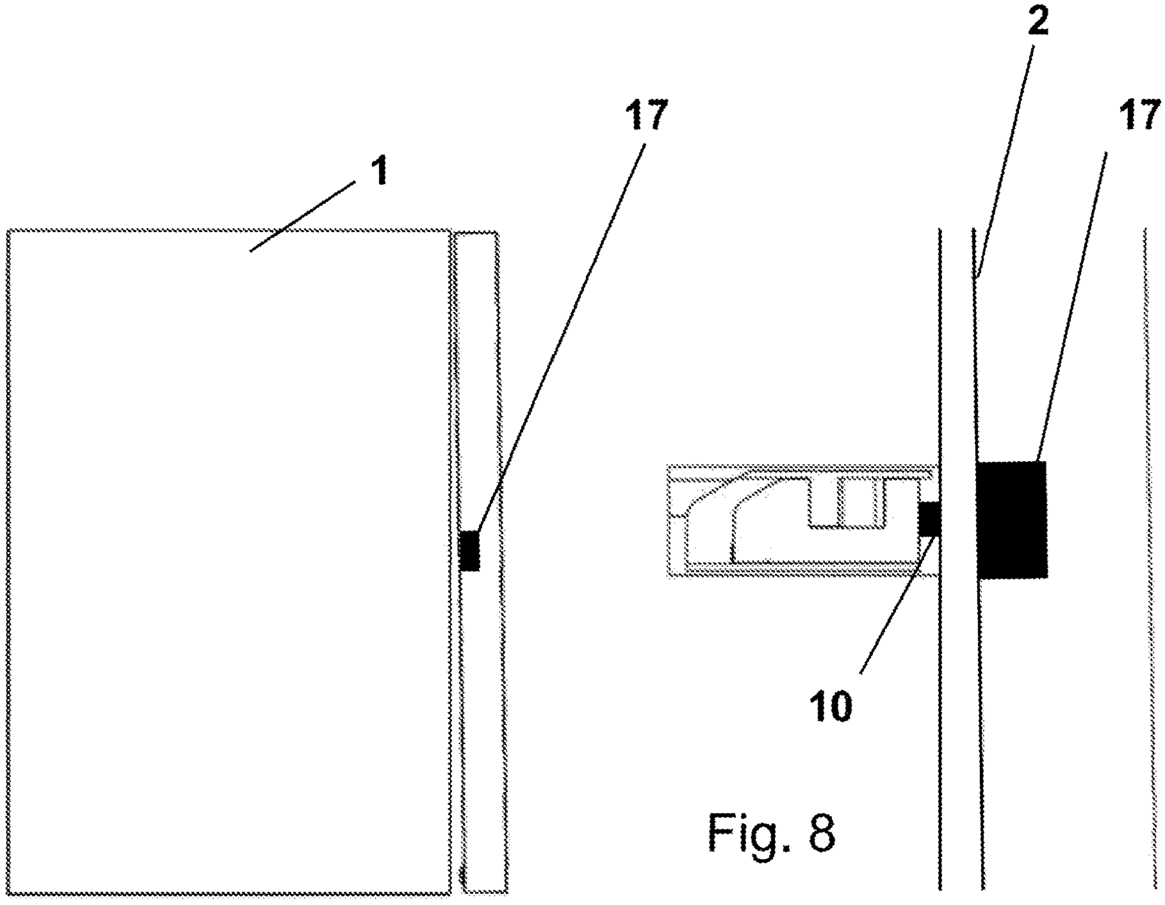

An embodiment of the invention is apparent from the drawings. They show:

FIG. 1 a cabinet with a pivoted flap,

FIG. 2 the cabinet according to FIG. 1 with the flap pivoted in,

FIG. 3 the cabinet of FIG. 1 with pivoted flap and a control unit with a plunger with sensor, FIG. 4 the cabinet of FIG. 1 with the flap pressed and an actuated control unit with a plunger with sensor, FIG. 5 a control unit with a tappet and a Hall sensor arranged between 2 magnets, FIG. 6 a control unit with a plunger and a Hall sensor arranged on the side next to 2 magnets, FIG. 7 a cupboard with a pivoted-out flap without a protruding one plunger, FIG. 8 the cabinet according to FIG. 7 with a magnet on the folded-in flap and a control unit with a sensor.

In the figures, a cabinet 1 with a flap 2 is shown. The flap 2 can be pivoted about an axis 4. A control unit 5 connected to a drive unit 3 and having a plunger 9 is arranged approximately in the middle of the cabinet. The control unit 5 can be moved back and forth in the direction of the double arrow 11 and is spring-loaded. If the flap 2 is in its closed position (FIGS. 2, 3), then it actuates the plunger 9, which is moved into the cabinet 1.

The plunger 9 (FIG. 4) carries two magnets 17 between which a Hall sensor is arranged. A return spring 13 is arranged in the bottom area. The return spring 13 strives to move the plunger outwards. Hall sensor 10 is stationary. On the other hand, the magnets 17 follow the movement of the plunger 9, so that the position of the sensor between the magnets 17 can be changed. Due to this change in the position of the sensor, it generates a signal that activates a control unit of the engine. The special feature of the sensor is that even small movements of the plunger, and thus also of the magnets, generate a sufficient signal to activate the motor.

The invention claimed is:

1. A body with a part that can be pivoted between two positions via an electric motor, the part is configured to actuate a control device in the course of its closing movement activating the motor, wherein a separate sensor is arranged between the control device and the motor, wherein the separate sensor is responsive to movements of the control device, wherein the separate sensor is configured to activate the motor in response to movements of the control device, wherein the control device carries two separate permanent magnets arranged at a distance from one another, wherein the sensor is arranged between the two magnets, wherein the control device exerts linear reciprocating movements in the course of its actuation.

2. The body according to claim 1, wherein the two permanent magnets are spaced apart from each other in the direction of movement of the control device.

3. The body according to claim 1, wherein the two permanent magnets lie on a line that is parallel to a longitudinal axis of the control device.

4. The body according to claim 1, wherein the sensor is located along the direction of movement of the control device within a recess formed within the control device.

5. The body according to claim 1, wherein the sensor is located laterally next to the control device.

6. The body according to claim 1, wherein the two magnets include magnetic poles, wherein the two magnets are aligned with the same magnetic poles towards each other in direction of the sensor.

7. The body according to claim 1, wherein during the movement of the control device, the relative position of the sensor can be changed in relation to the two magnets.

8. The body according to claim 1, wherein the sensor is a Hall sensor whose output signal controls the motor.

* * * * *